Patented Mar. 20, 1945

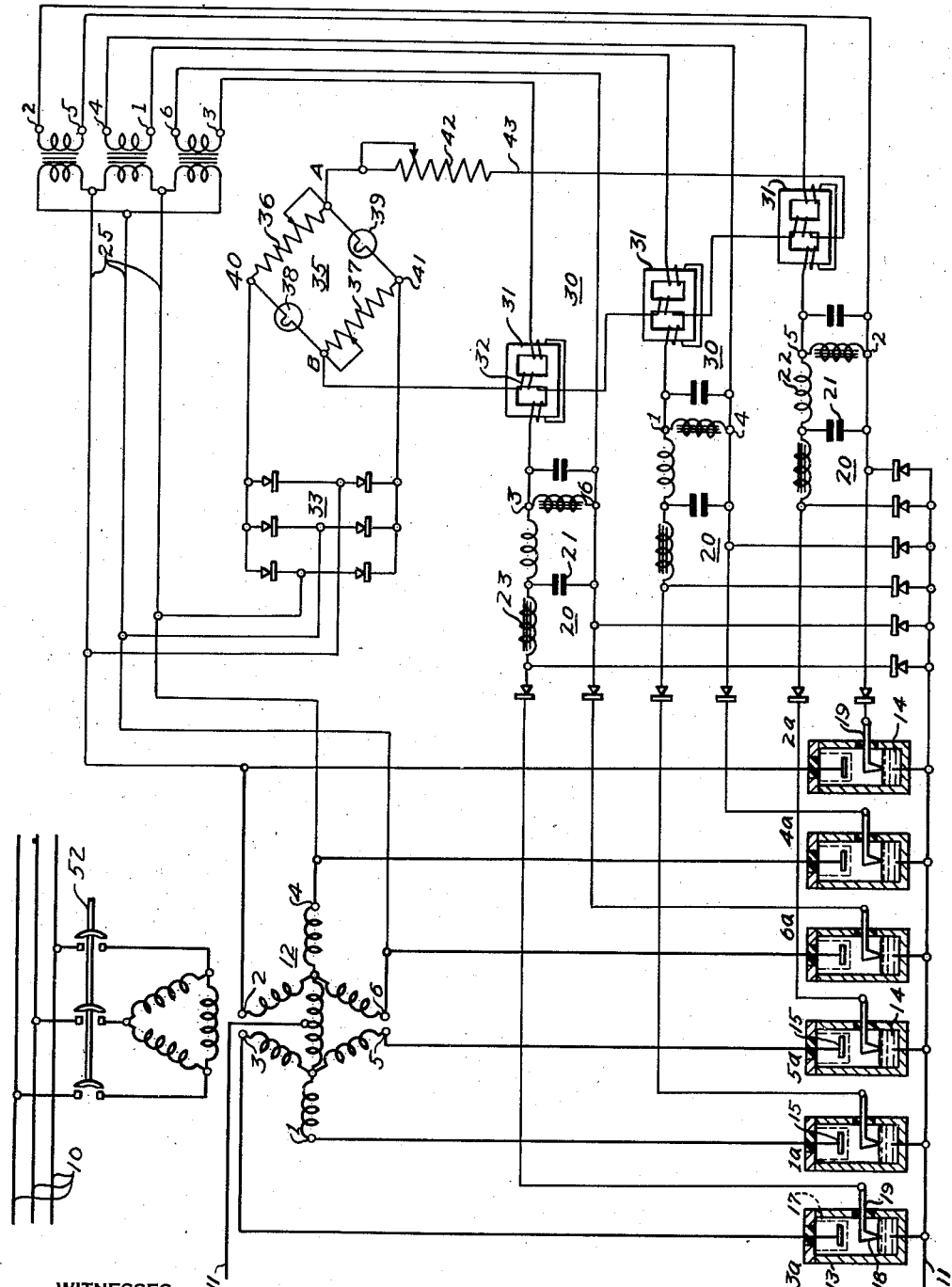

2,372,104

UNITED STATES PATENT OFFICE 2,372,104

VAPOR-ELECTRIC DEVICE

Henry C. Myers, Irwin, Pa., assignor to Westinghouse Electric & Manufacturing Company, East Pittsburgh, Pa., a corporation of Pennsylvania Application August 6, 1942, Serial No. 453,784

5 Claims. (Cl. 175—363)

My invention relates to a vapor-electric device, and particularly to a regulating system for controlling the output voltage of a vapor-electric converter.

Many industrial applications of vapor-electric converters require substantially constant direct current output potential regardless of the load variation. However, there is a tendency to potential variations not only because of the regulation of the converter itself from full load to light load, but also from a variation of the line potential supplied to the converter.

Heretofore it has been customary to control the output potential by means of varying the commutation angle or phase position at which individual anodes of the converter become conducting.

In grid controlled converters this was attempted to be accomplished by means of varying the instant of application of grid potential to control grids in the converter.

After the discovery of the make-alive type converter, such control was usually accomplished by controlling the grids of so-called firing tubes which acted to apply the make-alive impulses to the control electrodes of the individual valves.

Since the discovery of the so-called reactor firing circuit or wave distorter impulsing system, other means are necessarily resorted to to control the instant of the application of make-alive potential in the various valves of the converter. I have found that a very simple, efficient and relatively inexpensive device may be utilized to control the phase position of the make-alive impulses produced by impulsing systems such as the wave distorter circuits.

According to my invention a phase shifting network embodying a variable reactor is inserted ahead of the impulsing circuit and a biasing winding on the variable reactor is supplied with a potential from a source proportional to the load potential of the converter through a voltage-sensitive voltage-responsive variable-resistance network. This network is composed in the main of a resistance bridge, two legs of which are of the substantially constant resistance type and the other two legs are of a variable resistance type with the resistance variable with the supplied voltage.

Such a variable voltage-sensitive resistor can be an ordinary tungsten filament type electric lamp which is known to have a positive temperature coefficient of resistance. By adjusting the constant resistance in comparison to the resistance of the lamp, the value of the biasing potential applied by the network to the biasing winding of the variable reactor can be adjusted to the value needed to give full potential output at any desired load condition.

If the anode to anode voltage should change from time to time either because of the load regulation or the change of line potential, the variation in the voltage supplied to the lamps cause them to change their resistance and the direct current fed by the variable impedance network to the phase shifting reactor then will vary to shift the phase of the impulse in such a manner as to compensate for the change in direct-current output voltage which otherwise would occur.

It is, accordingly, an object of my invention to provide a simple and efficient means for regulating the output potential of a vapor electric converter.

It is a further object of my invention to provide a regulating network responsive to voltage variation for changing the phase angle of the excitation potential of a converter.

It is a further object of my invention to provide a regulating system responsive to the output potential of a vapor-electric converter for maintaining the output potential substantially constant.

It is a further object of my invention to provide a voltage sensitive electric bridge.

Other objects and advantages of my invention will be apparent from the following detailed description taken in conjunction with the accompanying drawing, in which the figure is a schematic illustration of an electric current conversion system according to my invention.

In the illustrative embodiment of my invention, an alternating-current circuit 10 herein illustrated as of the polyphase type, is connected by means of a circuit breaker 52 through a transformer 12 to a direct-current circuit 11. The transfer of energy between the alternating-current circuit 10 and the direct-current circuit 11 is controlled by means of a plurality of vapor-electric valves 1a to 6a herein shown as of the make-alive type.

Each valve comprises a pool cathode 14 of vaporizable reconstructing material such as mercury. A cooperating anode 15 is spaced in insulated relation to the cathode, an anode shield 17 preferably substantially encloses the anode 15 and a make-alive electrode 18 mounted on a lead-in rod 19 usually of nichrome or other high temperature resistant metal, the whole being enclosed in an evacuated container 13. The preferred construction being in accordance with the construction disclosed in copending application Serial No. 409,503.

While any suitable rectifier transformer 12 may be utilized, I have herein illustrated a so-called double three-phase transformer which supplies a plurality of pairs of terminals 1 to 6 connected to alternately conducting vapor-electric valves 1a to 6a. For convenience, I have indicated the phase terminals of the secondary winding of the transformer 12 as 1 to 6 and the associated valves as 1a to 6a with pairs 1—4; 2—5; and 3—6.

While various types of impulsing systems can be utilized, I have illustrated, for convenience, an impulsing system of the so-called reactor firing or wave distorter network.

The wave distorter network 20 for each pair of alternately conducting valves preferably comprises a storage capacitor 21 connected across a source 25 of control potential and having an impedance 22 connected between the source 25 and the capacitor 21 to control the flow of current from the source 25 to charge the capacitor 21, the make-alive electrodes 18 of the pair of valves are then connected in series across the terminals of the source including the capacitor 21 and the flow of current from the source 25 and the capacitor 21 through the make-alive electrodes 18 is controlled by a saturable reactor 23 which normally presents a very high impedance but when the applied potential reaches a value sufficient to force a saturating current through the reactor 23 it saturates and momentarily presents a very low impedance, thus permitting a heavy impulse of current to flow from the source 25 including the capacitor 21 to the make-alive electrodes 18 as fully pointed out in copending application Serial No. 404,888, filed July 31, 1941, and assigned to the same assignee as the present application.

Operating potential for the impulsing system is supplied from any suitable source 25 having the same frequency as the control potential. Herein I have illustrated this source 25 as being connected to the phase terminals 2, 4 and 6 of the main converter system. In order to control the phase position of the commutation or make-alive instant I have provided a phase shifting network 30 between the source 25 of make-alive potential and the impulsing circuits 20. The phase position of the input potential is controlled by means of a variable reactor 31 in the phase shifting network 30.

In order to control the variable reactor 31, a biasing winding 32 is supplied for inducing a premagnetizing effect in the reactor 31. A direct-current voltage proportional to the terminal voltage applied to the converter is secured by means of a suitable rectifying device 33 connected either directly or by means of a transformer to the phase terminals 2—4—6 of the converter.

The direct-current potential is supplied to the biasing windings 32 by means of a voltage sensitive variable resistance network or bridge 35 which forms the essential element according to my invention. This voltage sensitive variable resistance network 35 comprises a bridge having four legs or sides.

Two of these oppositely disposed legs are constructed or ordinary variable resistances 36—37 which may be tuned or adjusted to any desired resistance. The two remaining legs are composed of resistances 38—39 which have a high positive temperature coefficient of resistance. For this purpose, I have found that ordinary tungsten filament lamp bulbs are very effective. Usually bulbs of the order of resistance of 50 watts 110 volts are suitable for controlling the phase relation in a conversion system.

In the operation of the system, the direct-current proportional to the terminal voltage of the converter is applied to opposite corners 40—41 of the bridge network 35 while the remaining corners B—A are connected to the biasing windings 32 of the variable reactors 31. The normal resistors 36—37 are then adjusted to provide proper impedance for establishing the proper phase relation in the phase shifting networks 30. I have found that this adjustment should be such that point B should be positive with respect to point A. Sometimes it is desirable to utilize a series resistance 42 in the biasing winding circuit 43 to properly correlate terminal voltages and resultant currents.

If the terminal voltage of the converter should change for any reason such as a change in load or a change in high line potential, the direct-current voltage applied to the variable impedance network 35 would change. This change in applied potential changes the resistance of the positive temperature resistant characteristic resistors, 38 and 39 thereby changing the voltage applied to points B and A and causing a change in current through the biasing windings 32 to compensate for the change in output voltage which otherwise would occur.

For example, if the converter load decreased the anode to anode voltage and the direct current voltage applied to the voltage sensitive variable network 35 would tend to rise. The increase in voltage applied to the terminals of the network 35 causes the resistance of resistors 38 and 39 to increase, causing B to A voltage to decrease and reduce the current flowing in the biasing windings 32, thus shifting the phase of the current impulses to reduce the terminal voltage of the converter.

While my variable impedance voltage sensitive network 35 may be utilized in controlling the phase position or commutating angle of a converter supplied with control potential from any suitable source 25, I have found it particularly useful when the control potential is secured from the phase terminals of the main converter as the change in phase terminal voltage applied to the control circuit normally has a deleterious effect on the phase shifting network 30 and the simultaneous adjustment secured by the voltage sensitive variable impedance network 35 overcomes the phase shift which otherwise would occur.

While I have shown and described a specific embodiment of my invention, it will be apparent that changes and modifications can be made therein without departing from the true spirit of my invention or the scope of the appended claims.

I claim as my invention:

1. In an electric current conversion system for transferring electric energy between an alternating current circuit and a direct-current circuit having a plurality of electric valves for transferring energy between the circuits, a control system comprising a control electrode in each of said valves, a source of control energy for said control electrodes, impulsing means for applying energy impulses from said source to said control electrodes, a phase shifting network between said source and said impulsing means, said network including a variable reactor, a biasing winding on said variable reactor, a source of direct-current proportional to the potential applied to said electric valves and means including a voltage sensitive resistance network for impressing the potential of said source of direct-current on said biasing winding.

2. A regulating system for a vapor-electric converter comprising an impulsing system, a source of alternating control potential for said impulsing system, a phase shifting network interposed between said source of alternating control potential and said impulsing system, a variable impedance for controlling said phase shifting network, an actuating winding for varying said variable impedance, a source of direct current potential variable with the potential applied to said converter, a variable resistance network interposed between said source of direct current and said actuating winding, said resistance network including a resistor having a high positive temperature coefficient of resistance.

3. An electric translating system interconnecting an alternating current circuit and a direct current circuit comprising, a plurality of make-alive type valves, transformer means for distributing potential to said valves, a make-alive electrode for each of said valves, impulsing means for said make-alive electrodes, said impulsing means being energized from said transformer means, a phase shifting network interposed between said impulsing means and said transformer means, a variable reactor included in said phase shifting network, a biasing winding on said variable reactor, a source of direct current potential proportional to the potential applied to said valves and means including a voltage responsive resistance bridge for applying current from said source to said biasing winding.

4. An electric current conversion system interconnecting an alternating-current circuit and a direct-current circuit comprising, a plurality of make-alive type valves, transformer means connected to said circuits for distributing potential to said valves, a make-alive electrode for each of said valves, a source of alternating control potential, impulsing means energized from said source and connected to said make-alive electrodes for supplying make-alive impulses to said make-alive electrodes, a phase-shifting network interposed between said impulsing means and said source, a variable reactor included in said phase-shifting network, a biasing winding on said variable reactor, a source of direct-current potential proportional to the potential applied to said valve, and means including a voltage responsive resistance bridge for applying current from said source of direct current to said biasing winding.

5. An electric current conversion system interconnecting an alternating-current circuit and a direct-current circuit comprising, a plurality of make-alive type valves, transformer means connected to said circuits for distributing potential to said valves, a make-alive electrode for each of said valves, a source of alternating control potential, impulsing means energized from said source and connected to said make-alive electrodes for supplying make-alive impulses to said make-alive electrodes, a phase-shifting network interposed between said impulsing means and said source, a variable reactor included in said phase-shifting network, a biasing winding on said variable reactor, an auxiliary rectifier connected to the valve terminals of said transformer means, and means including a voltage responsive resistance bridge for applying the output of said auxiliary rectifier to said biasing winding.

HENRY C. MYERS.